D. C. WOODWORTH.
ANTISKID CHAIN TOOL.
APPLICATION FILED JUNE 28, 1919.

1,338,804.

Patented May 4, 1920.

INVENTOR.
Donald C. Woodworth

UNITED STATES PATENT OFFICE.

DONALD C. WOODWORTH, OF AUBURN, MAINE.

ANTISKID-CHAIN TOOL.

1,338,804.   Specification of Letters Patent.   Patented May 4, 1920.

Application filed June 28, 1919. Serial No. 307,446.

*To all whom it may concern:*

Be it known that I, DONALD C. WOODWORTH, a citizen of the United States, residing at Auburn, in the county of Androscoggin and State of Maine, have invented certain new and useful Improvements in Antiskid-Chain Tools, of which the following is a specification.

This invention relates to improvements in anti-skid chain tools. It is designed to provide a tool by means of which the cross chain can be easily and quickly removed from and applied to the side chains.

Figure 1:
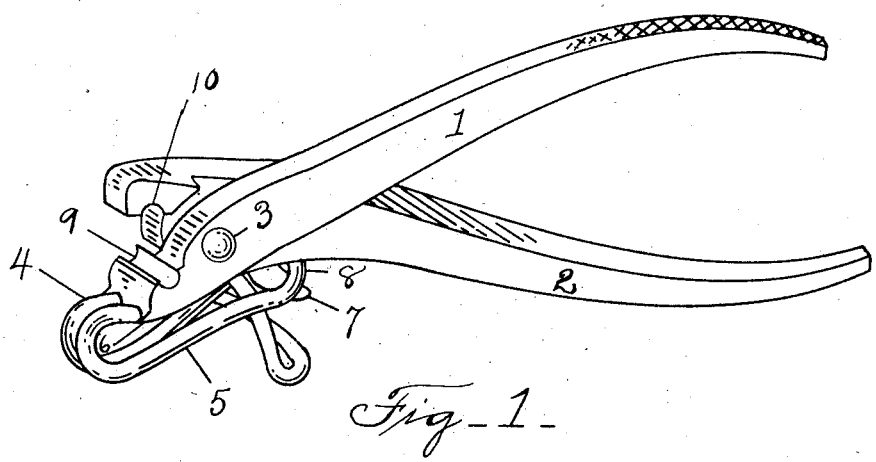
Figure 2:
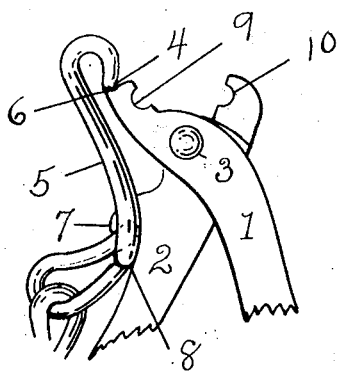
Figure 3:
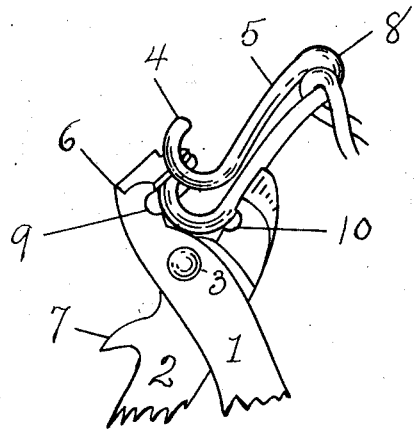

In the drawings herewith accompanying and making a part of this application, Figure 1 is a perspective view of my improved tool showing its application in opening the hook end of the link; Fig. 2 is a side elevation of my improved tool showing its application as in Fig. 1, except that the lug of the tool is in engagement with one of the chain links in the hook, and Fig. 3 is a perspective view of my improved tool showing its application in closing the hook end of the open link.

The same reference characters indicate like parts in the several figures.

In said drawings, 1 and 2 represent two jaw members pivotally united by a pivot 3. Taking up now the first use of the device, namely, opening the hook end 4 of the connecting link 5 preparatory to removing it from the chain or attaching it to the chain, it is noted that jaw member 1 is provided with a wedged shaped projecting lip 6, adapted to take under the hook end 4 of the connecting link 5, and the other jaw member 2 is provided back of pivot 3 with a lug 7 adapted to engage in the opposite end 8 of the connecting link.

In operation the jaws are separated. The lug 7 is inserted in the end of the connecting link and the lip 6 under the free end of the link. The jaws are then closed by pressure on the handles, thereby opening the hook ends sufficiently to receive the side chain, the operation being substantially the same, whether the hooks are opened while on the chain or preparatory to being placed upon the chain. As shown in Fig. 2, the lug may engage another link inserted in the end of the connecting link, thus adjusting the tool to the slight variations in the connecting link.

When it is desired to close the hook ends permanently upon the chain the jaw members are provided with adjacent recesses 9 and 10, respectively, in their adjacent faces. The open hook end of the link is then placed in said recesses in the jaws and the jaws closed, as before, thus forcing the hook ends down and into engagement with the side chain, when placed therein.

The advantages of my improved tool are: that it combines in one tool means for both opening and closing the hook ends of the connecting link, that it is powerful in operation and compact so as to require little room for storage.

I claim:—

1. In a device of the character described, two jaw members pivotally united and provided with handle members, one provided with a hook end engaging tapering lip and the other with a link engaging lug, said lip and lug being positioned on opposite sides of the pivot relative to the length of the handles.

2. In a device of the character described, two jaw members pivotally united and provided with handle members, one provided with a hook end engaging tapering lip and lug and the other with a link engaging lug, said lip and lug being on opposite sides of the pivot relative to the length of the handles, the jaws being provided with registering recesses in their adjacent faces.

In testimony whereof I affix my signature.

DONALD C. WOODWORTH.